United States Patent
Zhang et al.

(10) Patent No.: US 11,687,672 B1
(45) Date of Patent: Jun. 27, 2023

(54) DATA ACCESS GATEWAY FOR SECURITY AND PRIVACY

(71) Applicant: Beijing Bytedance Network Technology Co., Ltd., Beijing (CN)

(72) Inventors: Jianqing Zhang, Los Angeles, CA (US); Zhengqin Luo, Los Angeles, CA (US); Zhipeng Tian, Culver City, CA (US); Lifeng Sang, Los Angeles, CA (US); Mu Du, Culver City, CA (US); Ruoxin Shen, Los Angeles, CA (US); Xuan Zhang, Culver City, CA (US)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/694,540

(22) Filed: Mar. 14, 2022

Related U.S. Application Data (60) Provisional application No. 63/297,469, filed on Jan. 7, 2022.

(51) Int. Cl.
    *G06F 21/62* (2013.01)
    *G06F 21/60* (2013.01)
    *H04L 12/66* (2006.01)
    *H04L 9/40* (2022.01)

(52) U.S. Cl.
    CPC ........ *G06F 21/6254* (2013.01); *G06F 21/604* (2013.01); *H04L 12/66* (2013.01); *H04L 63/205* (2013.01)

(58) Field of Classification Search
    CPC ..... G06F 21/604; G06F 21/6245–6254; H04L 63/0421; H04L 63/0428; H04L 63/205; H04L 2209/42
    See application file for complete search history.

(56) References Cited

U.S. PATENT DOCUMENTS

| | | | |
|---|---|---|---|
| 2011/0072142 A1* | 3/2011 | Herz ................... | G06F 21/6254 709/229 |
| 2022/0101964 A1* | 3/2022 | Prasad ................ | G06F 21/6254 |

* cited by examiner

*Primary Examiner* — Kevin Bechtel (57) ABSTRACT

Systems and methods for processing data are described. More specifically, a query request may be received and a data pattern may be identified in the query request. Personally identifiable information associated with the query request may then be de-pseudonymized. Accordingly, a second request using the de-pseudonymized personally identifiable information and receiving a response to the second request may be generated. The personally identifiable information in the response may be pseudonymized such that the pseudonymized personally identifiable information and data included in the response is provided to a client.

20 Claims, 7 Drawing Sheets

DATA ACCESS GATEWAY FOR SECURITY AND PRIVACY

CROSS-REFERENCE TO RELATED APPLICATIONS

This application claims priority to U.S. Provisional Application Ser. No. 63/297,469 filed Jan. 7, 2022 and titled "Data Access Gateway for Security and Privacy" the disclosure of which is incorporated herein by reference in its entirety.

BACKGROUND

Data centers and edge computing technologies, such as content distribution networks (CDNs), are widely used to enhance service quality by running services and caching contents closer to end-users. Many companies utilize data centers distributed across the world and located in different jurisdictions (e.g., country, nation, state, province, territory, etc.) to reduce cost and further improve service quality; some data centers utilized by the company may be self-built and may utilize private software stacks and protocols that commercial vendors do not support but are otherwise made available by the self-built data center. However, using private software and accessing such private software residing on self-built data centers may bring risks in user privacy. For example, user information including, but not limited to, user internet protocol addresses, usernames, passwords, payment information, and other user sensitive data may be identified, tracked, and/or otherwise compromised. In some instances, employees of a first jurisdiction (e.g., a first country, nation, state, province, territory, etc.) or otherwise associated with the first jurisdiction may knowingly or unknowingly access user data associated with a second jurisdiction (e.g., a second country, nation, state province, territory, etc.) that is different than the first jurisdiction. As user data and user privacy are of top concerns, potential security issues and privacy issues may jeopardize the adoption of services offered by a company and/or the adoption of self-built data centers, specifically in jurisdictions having differing user and data privacy regulations.

BRIEF SUMMARY

In accordance with examples of the present disclosure, a generalized infrastructure, solution, and framework are described that provide a trustworthy and security compliant centralized data checkpoint to limit and/or verify data access for data residing in a data center located in a first jurisdiction. For example, employees of a company and residing in the first jurisdiction may be bound by user and data privacy regulations of that first jurisdiction, while employees of the company and residing in a second jurisdiction may be bound by the user and data privacy regulations of the first jurisdiction, data security and privacy regulations of the second jurisdiction, and user and data privacy regulations that may exist between the first jurisdiction and the second jurisdiction. The generalized infrastructure, solution, and framework described herein guarantees that access to data at a first data center located in a first jurisdiction by employees residing in or otherwise associated with a second jurisdiction is limited; that is, the employees residing in or otherwise associated with a second jurisdiction are restricted as to which data can be accessed at the data center located in the first jurisdiction. Stated another way, the generalized infrastructure, solution, and framework described herein guarantees that only approved data at the data center located in the first jurisdiction can be accessed by company employees located in or otherwise associated with a second jurisdiction via internal access applications and procedures, implemented in an internal web application for example.

In accordance with examples of the present disclosure, the generalized infrastructure, solution, and framework provides a centralized data access point which constrains all traffic from particular type of user or employee and directs this specific traffic to a corresponding gateway. This corresponding gateway will then scan the data and check an applied data schema to understand what kind of data the user or employee is requesting and then based on a data type or a data category associated with the request, determine a policy, from a policy repository, that may be applied. Accordingly, the different types of data processing guarantees that the users or the employees from the different jurisdictions can obtain different sets of subsets of data from the first jurisdiction data center, which may include sensitive data that is stored and protected for purposes of compliance and regulation requirements. That is, a same gateway may be used, but depending on where a data access originates, or the information that is being requested, a different policy might be applied to the request or the requested data.

The generalized infrastructure, solution, and framework described herein includes details of a data access gateway for security & privacy and operations of one or more applications operating within the data access gateway for security privacy. An example of an application operating within the data access gateway for security privacy may include but is not limited to a log retrieval service. Thus, the data access gateway for security privacy provides a single entrance point and a centralized data process and policy enforcement that may be third-party verifiable and auditable and further adaptive to changes in policy or compliance requirements. That is, a data access gateway for security and privacy may work as a proxy for all approved/registered internal applications within a data center. Moreover, the data access gateway for security privacy can block any access to protected data and ensure that only approved data, such as engineering data, can be accessed by company employees located in or otherwise associated with a second jurisdiction that is different than a first jurisdiction. Further, all data that is accessed through the data access gateway for security privacy can be audited and verified.

In accordance with examples of the present disclosure, a method for processing data is described. The method may include: receiving a query request and identifying a data pattern in the query request, de-pseudonymizing personally identifiable information associated with the query request, generating a second request using the de-pseudonymized personally identifiable information and receiving a response to the second request, pseudonymizing the personally identifiable information in the response and providing the pseudonymized personally identifiable information and data included in the response to a client.

In accordance with examples of the present disclosure, a system for processing data is described. The system may include a storage area; and a data access gateway for security privacy configured to: receive a query request and identify a data pattern in the query request; de-pseudonymize personally identifiable information associated with the query request; generate a second request using the de-pseudonymized personally identifiable information and receiving a response to the second request; pseudonymize the personally identifiable information in the response; and provide the pseudonymized personally identifiable information and data included in the response to a client.

In accordance with examples of the present disclosure, an electronic device is described. The electronic device may include a memory and a processor; wherein the memory is used to store one or more computer instructions which, when executed by the processor, cause the processor to: receive a query request and identify a data pattern in the query request; de-pseudonymize personally identifiable information associated with the query request; generate a second request using the de-pseudonymized personally identifiable information and receiving a response to the second request; pseudonymize the personally identifiable information in the response; and provide the pseudonymized personally identifiable information and data included in the response to a client.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems, or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples provided herein, a generalized infrastructure, solution, and framework includes an operations assurance model that allows employees located at an operations center located in a first jurisdiction the opportunity to review and approve data schema proposals by company employees located in a second jurisdiction; once reviewed, such schema proposals can be made effective immediately. Further, another entity may audit the entire schema review process and can open a support ticket if something appears to be wrong or otherwise out of place. Thus, the employees located at the operations center in the first jurisdiction can respond to the ticket under a service level agreement (SLA). Further, the generalized infrastructure, solution, and framework provides the entity and company located in the second jurisdiction a path to determine a process for allowing company employees located in the second jurisdiction the option to submit patches and perform updates to a data access gateway for security privacy code repository. In accordance with examples of the present disclosure, a trust access protocol may be configured such that it applies to existing roles, new roles, and existing trusted roles. Such protocol may be configured based on an operations center, employee, location, etc.

Figure 1:
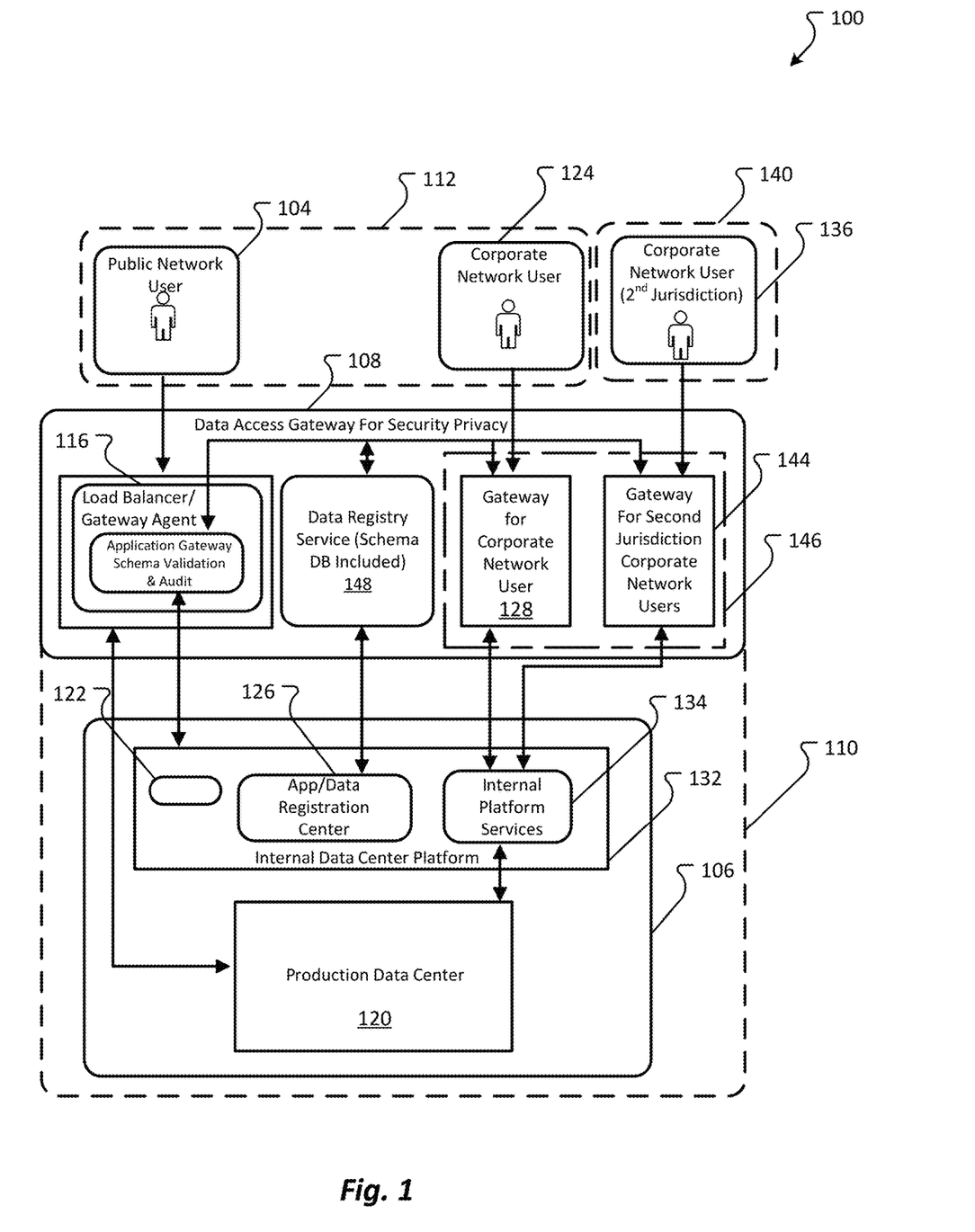
FIG. 1 depicts an example architecture of the generalized infrastructure, solution, and framework in accordance with examples of the present disclosure.

FIG. 1 depicts an example architecture of the generalized infrastructure, solution, and framework 100 in accordance with examples of the present disclosure. The example architecture of the generalized infrastructure, solution, and framework 100 may provide a centralized data access point to constrain all traffic from particular types of users or employees and direct this specific traffic to a corresponding gateway. For example, a public user 104 making a data request may first send the data request to the data access gateway for security privacy 108; the public network user 104 may reside within a first jurisdiction 112 and therefore such request may be provided to a load balancer/gateway agent 116, where the load balancer/gateway agent 116 may validate and audit a data access schema prior to submitting the request to a production data center 120 where such requested data may be returned. As another example, a corporate network user 124 residing in a first jurisdiction 112 may make a request to the data access gateway for security privacy 108; the corporate network user 124 may reside within the first jurisdiction 112 which may be the same as the jurisdiction in which the production data center 120 resides and therefore such request may be provided to a gateway (e.g., 128) specific to the first jurisdiction 112. Thus, one or more App/Data Registration Centers 126 at an internal data center platform 132 may be utilized to service the request made by the corporate network user 124. In another example, a corporate network user 136 residing in a second jurisdiction 140 (e.g., a corporate network user residing in a jurisdiction that is different than the jurisdiction (e.g., 112) of the production data center 120 and/or the corporate network user 124 that resides in the first jurisdiction 112) may make a data request to the production data center 120; such data request may be routed specifically to a gateway 144 for second jurisdiction corporate network users specific to the second jurisdiction 140 and/or jurisdictions other than the first jurisdiction 112. Thus, the gateway 144 for second jurisdiction corporate network users may handle the specific request and use an App/Data Registration Center to service the request. The corporate network user 124 residing in a first jurisdiction 112 may be identified as a corporate network user 124 residing in a first jurisdiction 112 based on, but not limited to one or more of a location information associated with the user 124, location information associated with an originating request from a computing device associated with the user 124, a security policy associated with the user 124, a username identifier associated with the user 1234, etc. The corporate network user 136 residing in a second jurisdiction 140 may be identified as a corporate network user 136 residing in a second jurisdiction 140 based on, but not limited to one or more of a location information associated with the user 136, location information associated with an originating request from a computing device associated with the user 136, a security policy associated with the user 136, a username identifier associated with the user 136, etc. A gateway agent 116 corresponding to or otherwise selected to process a data request will then scan the received data and check an applied data schema to understand what kind of data the user or employee is requesting and then based on a data type, or a data category associated with the request, determine a policy that may be applied from a security policy repository 122. Accordingly, the different types of data processing guarantees that the users or the employees from the different jurisdictions can obtain different sets of subsets of data from the production data center 120 located in the first jurisdiction 112, which may include sensitive data that is stored and protected for purposes of compliance and regulation requirements. That is, a same gateway 108 may be used, but depending on where a data access originates, or the information that is being requested, a different policy might be applied to the request or the requested data, where the policy may be retrieved from a data repository and based on context surrounding the user. For example, a user identifier, request origination identifier (e.g., IP address) associated with a mobile computing device of the user, and/or other information utilized to identify a policy may be utilized. In examples, the gateway for corporate network users 128 and the gateway for second jurisdiction corporate network users 144 may reside at a same device 146.

The generalized infrastructure, solution, and framework 100 described herein includes details of a data access gateway for security privacy 108 and operations of one or more applications operating within the data access gateway for security privacy 108, such as but not limited to a log retrieval service. Thus, the data access gateway for security privacy 108 provides a single entrance point and a centralized data process and policy enforcement that may be third-party verifiable and auditable and further adaptive to changes in policy or compliance requirements. That is, a data access gateway for security privacy 108 may work as a proxy for all approved/registered internal applications within a production data center 120. Moreover, the data access gateway for security privacy 108 can block any access to protected data and ensure that only approved data, such as engineering data, can be accessed by company employees located in or otherwise associated with a second jurisdiction that is different than a first jurisdiction 112. Further, all data that is accessed through the data access gateway for security privacy 108 can be audited and verified. In examples, the data access gateway for security privacy 108 may additionally include an internal data platform 132 and a production data center 120. In examples, the data access gateway for security privacy 108 may be separate from a datacenter 106 including the internal data center platform 132 and the production data center 120.

A control plane 126 may provide a mechanism to register approved data (catalog, labels, and schemas) and applications. Such a control plane may be shared by the Gateway for Corporate Network Users 128. The control plane may be tasked with registering/un-registering approved applications and channels via a control center; and registering and labeling structured data carried by registered applications/channels. Any unlabeled data can be considered as sensitive data and the API carrying the data will be blocked. The control plane 126 may further be tasked with defining and/or updating data processing policies.

Figure 2:
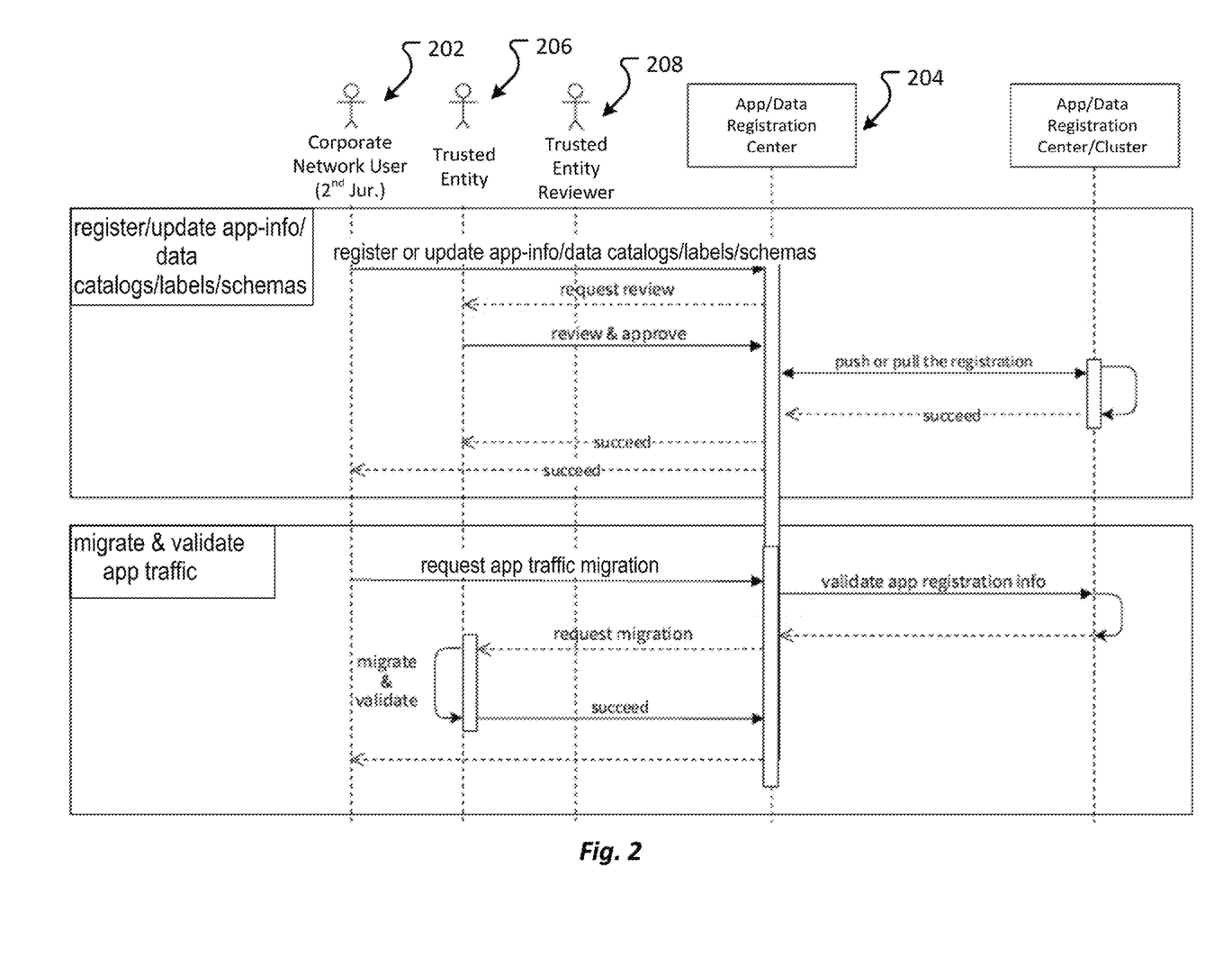
FIG. 2 depicts an example of registration request processing in accordance with examples of the present disclosure.

FIG. 2 depicts an example of registration request processing in accordance with examples of the present disclosure. As depicted in FIG. 2, employees, or corporate users, 202 of a company located in the second jurisdiction (e.g., 140) may send registration requests to the App/Data Registration Center 204. A trusted entity 206 may review and approve the request via the App/Data Registration Center 204. By default, the approved app/channel/data schemas will be pushed to or pulled by the data plane (Data Registry Service 148) and can be made to be effective or otherwise implemented immediately. The trusted entity reviewer 208 can audit and/or review the review decisions made by the trusted entity 206. In some examples, the trusted entity reviewer 208 may override a decision made by the trusted entity 206 if needed.

Newly registered applications may include a new data catalog, new data labels and new data schemas, a.k.a., data definition. A data catalog may define or otherwise include the classifications of all data, including but not limited to approved data, protected data, and/or sensitive data. The classification of approved data may be indicated by a category identifier and may be dependent upon the type of data and the detail category assigned to the data. For example, some of the data may be defined as data residing at the company in the first jurisdiction (e.g., 112), or the company in the second jurisdiction (e.g., 140). Depending on such cataloging, the type of data may be assigned one or more details, labels, etc.

Data labels may represent data categories, including a Datatype and a Semantic Type. An example may include an email address that is used as an account identifier for a video hosting platform (VHP). For example, a data label may be represented as follows:
JSON
{
"label": {
    "tag_id": "1-1-1-2", "datatype": {
        "basictype": "string",
        "regx": "[\w-\.]+@([\w-]+\.)+[a-z]{2,3}" // this is an email
    },
    "semantictype": "VHP account", "attributes": [
        {"ns": "data_compliance", "value": "protected" },
        {"ns": "visibility", "value": "private" }
    ]
}
}

In examples, a data schema may define or otherwise include a complete data object used as a payload in a request or response. The data scheme may include a set of single data fields or nested data objects. An example of a data scheme includes an email address associated with an account of a video hosting platform (VHP) within a response and may be represented as follows:
JSON
{
  "version": "1.0.0",
  "ns": "http", // the email address is used in a http response
  "location": "r:us/vdc:loc", // the location of the service
  "path": "xyz.abc.feedback.platform/api:/user/feedback/api/v1/list/get_feedback_histories/type:response/name:userdata.VHP_acct", // the data instance URI
  "tag_id": "1-1-1-2",
}

Attributes may indicate the attributes of a data label in terms of different security requirements or context. A particular attribute is defined by or otherwise includes a namespace and value, where the namespace defines or otherwise includes the security requirement or context. For example, an email_address's attribute in a project identified as "Data_Compliance" is protected and the visibility is private. An example of an attribute may be provided as:
JSON
{
"attributes": [
  {"ns": "data_compliance", "value": "protected" },
  {"ns": "visibility", "value": "private" }
]
}

A policy may include policy rules which may include a triplet of subject, object, and action. A policy generally indicates a given subject and what actions should be performed on an object. For example, a policy may anonymize all data whose attributes under a project is protected if it is accessed by an employee of the company located at the second jurisdiction (e.g., 136).

Implementing the above generalized infrastructure, solution, and framework described above enhances security by (a) providing full control of data traffic in the production environment for data centers located in the first jurisdiction; (b) providing full control of metadata, as a trusted entity exclusively manages metadata; (c) allowing the trusted entity to be the final approver of registered applications, data catalog/labels/schemas and polices in the control plane; (d) performing built-in schema validation in the data plane thereby limiting or not allowing dynamic data structures as the data is structured; and (e) annotating each data field with business usage information and labeled by a data type, such as project "Data_Compliance" for example as a data type.

In accordance with examples of the present disclosure, a trusted entity, such as a trusted entity data center 106/110, may include capabilities and configurations to setup isolated zones, such as but not limited to zones including internal platform services 134 and a production data center 120, within the trusted entity data center 106/110. That is, the trusted entity may provide the capability and configurations to route traffic from network users (e.g., employees 136) of a company located in a second jurisdiction (e.g., 140) to internal platform services 134 and/or the production data center (e.g., 120) located in a first jurisdiction (e.g., 112) via the gateway for second jurisdiction corporate network users (e.g., 144). Thus, the trusted entity may provide the capability to allow traffic from the employees (e.g., 136) of the company located in the second jurisdiction (e.g., 140) to an operations center located in the first jurisdiction (e.g., 112) via a service zone. The trusted entity may provide the ability to allow traffic from a service zone to enter a trust zone, for purposes of metadata synchronization for example. In examples, the trusted entity may provide the capability to reject/disallow traffic from employees (e.g., 136) of the company located in the second jurisdiction (e.g., 140) and traffic from the operations center located in the first jurisdiction to the trust zone, where the trust zone may include access to the internal platform services 134 and/or internal data center platform 132. The trusted entity may build and manage an operations gateway for the second jurisdiction corporate network users 144, which may be an isolated zone hosting a dedicated load balancer and data plane for routing employees of a company located in the second jurisdiction, while the operations gateway for the second jurisdiction corporate network users 144 may be owned and/or operated by the trusted entity that is owned and/or operated by a company that is different from the company located in the second jurisdiction.

Figure 3:
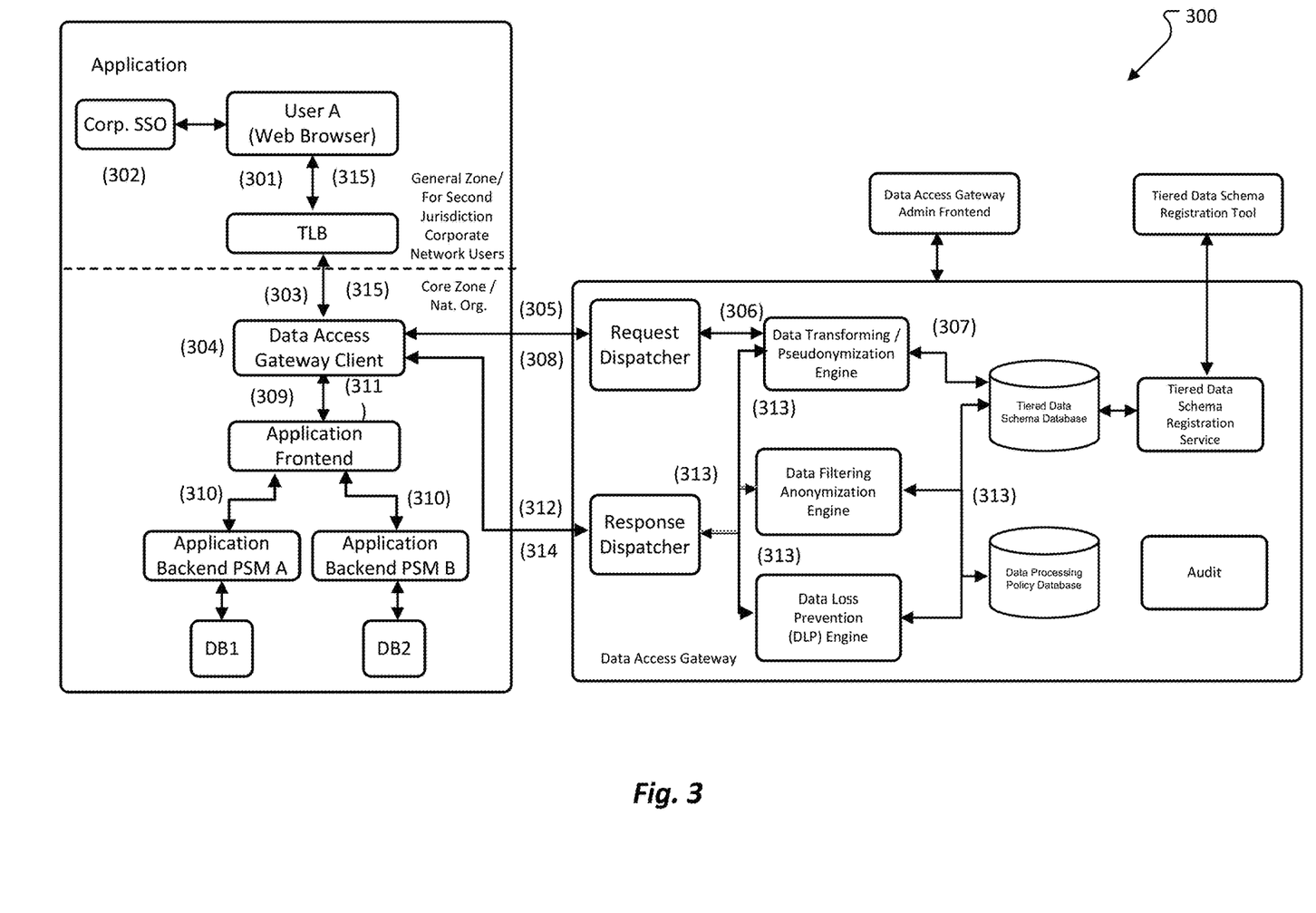
FIG. 3 depicts an example operation process 300 that implements a query against an information store, such as a wallet information store, in accordance with examples of the present disclosure.

FIG. 3 depicts an example operation process 300 that implements a query against an information store, such as a wallet information store, in accordance with examples of the present disclosure. The process 300 may be initiated at 301 where a user using a web browser may visit a wallet service page, such as va-wallet-test.domain.net/page/accountInfo. At 302, if the an employee using the service and visiting the wallet service page has not logged in, the request may be directed to an authentication single sign-on (SSO) service to complete the authentication and obtain an SSO token. Accordingly, an employee_id, name, email, and location may be known or supplied from the sign-on process or otherwise. For example, at 303, a name, email, employee_id, and location may be entered or received, via javascript, for example. As an example, the JavaScript may be:
JavaScript
ctx.session.user={email: ssoUser.email, name: ssoUser.name, employee_id: ssUser.emplooyee_id, employee_location: ssoUser.location};
In some examples, the location of access, or location of the user, may be confirmed with a single sign-on service.

At 304, an http request may request usage information based on a UserID that is the subject of the request. At 305, the registered applications and their functions may include a parameter, the location of the employee's work ssoUser.location, and an application deployment environment process.env.ZONE. A data access gateway client may extract a pseudonymized UserID, and request a real UserID for a data access gateway verification service request. At 306, a request processing service may call a data pseudonymization engine to request the restoration of the real UserID. At 307, the data pseudonymization engine may retrieve a hierarchical data pattern database to determine a strategy and configuration to perform pseudonymization restoration. At 308, a request processing service may send the real UserID back to the data access gateway client, such that the data access gateway client can reformulate the HTTP using the real UserID and forward it to the application service frontend at 309.

At 310, the data access gateway client can initiate and/or maintain a session. For example, the application service frontend can request the use of wallet information from downstream services and databases (e.g., application backend PSM A and DB1 and/or Application Backend PSM B and DB2, according to the business definition, and obtains a result. At 311, the application service frontend may send the result back to a Web Client Wallet in the form of an http reply.

At 312, a data access gateway client may intercept the http reply, and rewrite the message content according to previous session information and a definition of the data pattern/ grading database. Such information may be forwarded to the data access gateway reply processing service. At 313, a data access gateway reply processing service, such as the response dispatch, may send the content to the corresponding engine (e.g., data transforming/psuedonymization engine, data filtering anonymization engine, and/or data loss (DLP) engine) for processing according to the definition of context and data pattern/grading database. In examples, at 313, the UserId may be pseudonymized again, where for registered structured data, if the access associated with the user does not have a specific level of data access to read, it will be defined according to another data classification category. In some examples, the anonymization may include the DLP processing for non-structured/semi-structured and unregistered data. The data access gateway reply processing service may send the desensitized reply message back to the data access gateway client at 314. Thus, at 315, the data access gateway client can return the desensitized data to the user. As depicted in FIG. 3, requests from the web browser may be originating from users or employees of a company associated with, or otherwise in, a second jurisdiction; such requests may be directed to a zone or data residing in a different jurisdiction.

According to the above example, there is very little impact, if at all, on the business logic of existing applications; for an entire service call chain, the data storage of the database does not require additional changes; the system is able to efficiently realize data collection and processing and can be used for subsequent auditing. Moreover, it may be easier to obtain the authentication information of the user/employee, and use it for the identification of the employee and the use of the desensitization strategy. By adding a layer of data processing, there may be an additional one to two round-trip data transfers, which may increase a certain query delay.

Figure 4:
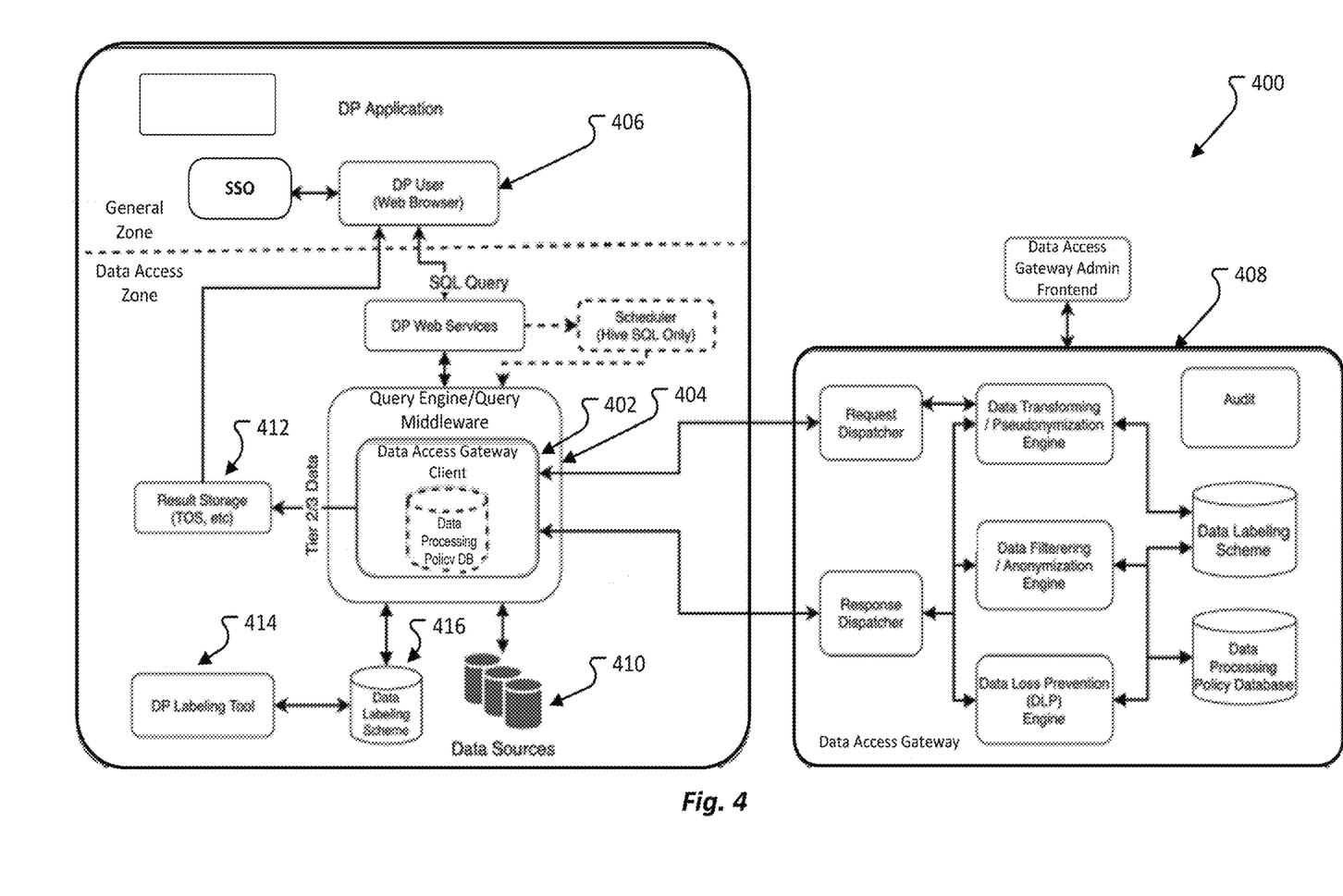
FIG. 4 depicts an example of the data platform of the data access gateway in accordance with examples of the present disclosure.

FIG. 4 depicts an example of the data platform of the data access gateway in accordance with examples of the present disclosure. In some implementations, the data platform (DP) serving data products accepted a variety of flexible and complex SQL queries and calculations. While such queries may be difficult to determine and the data sensitivity may be determined based on the underlying data source (library, table, row, column), etc., the DP platform depicted can include multiple query engines or multiple types of query middleware, which can parse queries, such as SQL queries, submitted by users and combine context to control permissions and read data. These two types of middleware can be located at the intermediate nodes of all upper-level application services such that different data sources at the bottom can be desensitized to data. As another example, if the data access gateway directly intercepts the http request, it automatically interprets the SQL query and adds additional data for the data access gateway which increases the difficulty of parsing. Further, the lack of contextual information about the data source may also contribute to the difficulty in parsing. In addition to the http page return and the data output of the DP, there is a path to provide additional downloads through third-party storage services. The aforementioned scheme cannot fully control all data channels.

In view of the above considerations, a data access gateway client 402 may be integrated with one or more query engines 404 and implemented in the query middleware. Thus, the collection and management of sensitive data can be performed using the query engine/query middleware.

An example work process is as follows:

After the user completes authentication, the SQL query is entered on the data product client (browser) 406. The one or more query engines may receive the SQL queries and analyze the SQL queries. If the SQL query involves parameters that have been pseudonymized, such as a UserID, the one or more query engines 404 can pass the data to the data access gateway 408, to restore the real parameters at the conclusion of the process.

The one or more query engines 404 can query the data from the data sources 410 using a data engine based on the final analysis results. After the one or more query engines 404 obtain the returned data, the one or more query engines 404 can query a data pattern library and desensitization strategy, as well as the attributes used, and then desensitize related result fields or calculation results. In examples, a DP labeling tool may label data in accordance with a data labeling policy. In examples, the desensitization operation itself can be done locally in the query middleware 404, but relevant data processing decisions may be performed by the data access gateway 408. The one or more query engines 404 return the desensitization result to the user at the web browser 406 for example, or provide such information to a third storage space 412 for download.

Based on the above, there is no little impact, if any, on the business logic of existing applications. Although the DP query middleware 404 may utilize multiple data sources, it can still efficiently implement data collection and processing, which can then be used for auditing. In addition, a separation may exist between the web browser 406 and the query engine/query middle ware 404. As previously mentioned, the data access gateway client 402 does not need to perform SQL analysis, which improves therefore efficiency of the process described above. Adding a layer of data processing and adding one or two round-trip data transfers may increase a certain delay associated with the query—especially when there is a lot of data and when inquiring about the large amount of data.

Figure 5:
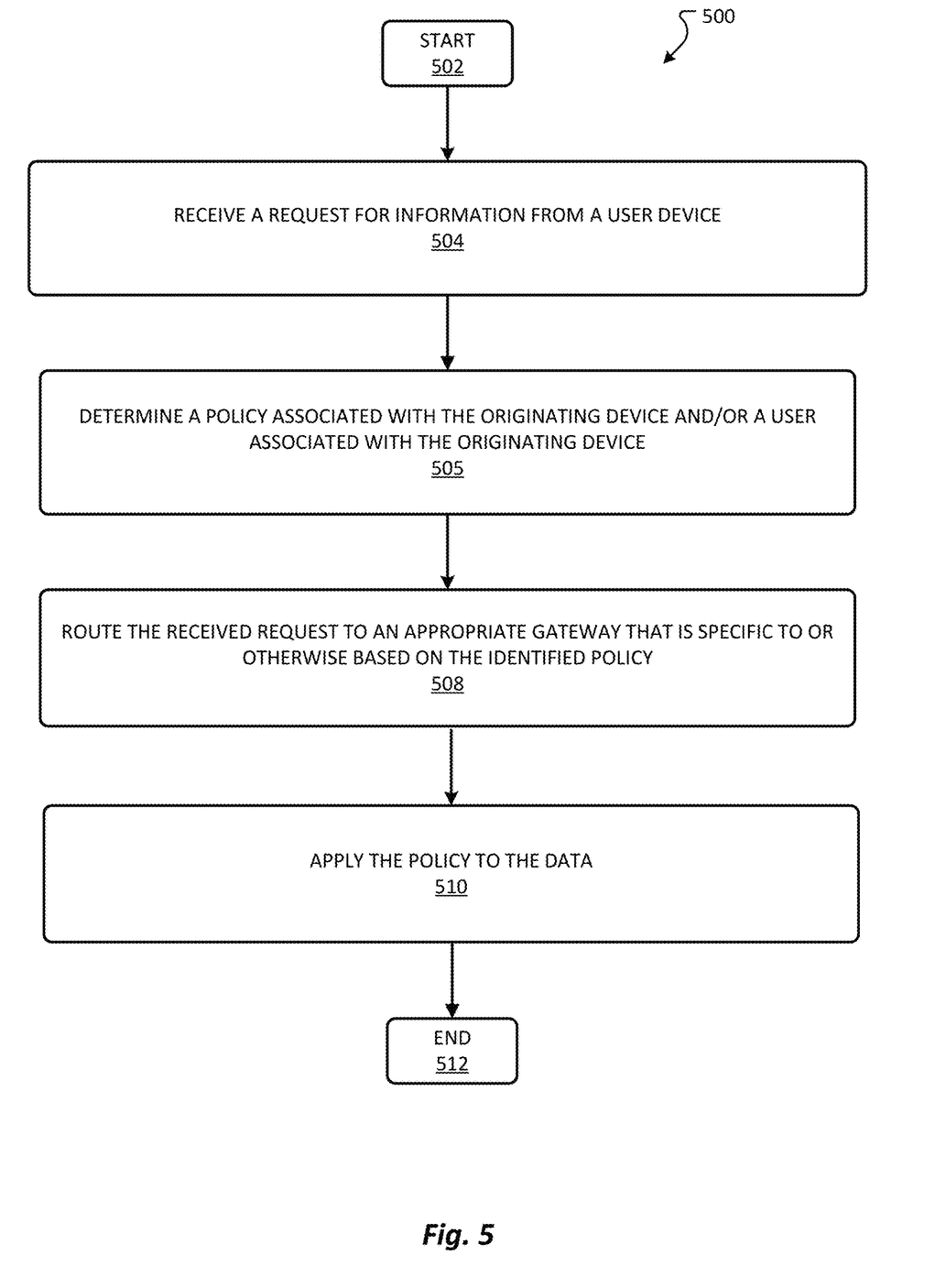
FIG. 5 depicts a simplified method for routing an incoming request from a requesting entity to an appropriate gateway, determining a policy associated with the incoming request, and applying the policy to the request, such as but not limited to applying the policy to data received in the request and/or data going to the requesting entity, is displayed in accordance with examples of the present disclosure.

Referring now to FIG. 5, a simplified method for routing an incoming request from a requesting entity to an appropriate gateway, determining a policy associated with the incoming request, and applying the policy to the request, such as but not limited to applying the policy to data received in the request and/or data going to the requesting entity, is displayed in accordance with examples of the present disclosure. A general order for the steps of a method 500 is shown in FIG. 5. Generally, the method 500 starts at 502 and ends at 512. The method 500 may include more or fewer steps or may arrange the order of the steps differently than those shown in FIG. 5. The method 500 can be executed as a set of computer-executable instructions executed by a computer system and encoded or stored on a computer readable medium. In an illustrative aspect, the method 500 is executed by a computing device, such as a data access gateway for security privacy 108, a gateway for corporate network user 128, and/or a gateway for a second jurisdiction corporate network user 144. However, it should be appreciated that aspects of the method 500 may be performed by one or more processing devices, such as a computer, server, or other hardware element. Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, etc. described in conjunction with FIGS. 1-4.

The method 500 starts at 502, where flow may proceed to 504. At 504, a request maybe received from an originating device associated with a user. For example, a request for information may be received from a user device. In accordance with examples of the present disclosure, a policy associated with the originating device and/or a user associated with the originating device may be determined at 506. For example, a user identifier, request origination identifier (e.g., IP address) associated with a computing device of the user, and/or other information utilized to identify a policy may be utilized, may be used to identify a policy. At 508, the received request may be routed to an appropriate gateway that is specific to or otherwise based on the identified policy. At 510, the policy may then be applied to the data. The method 500 may end at 512.

Figure 6:
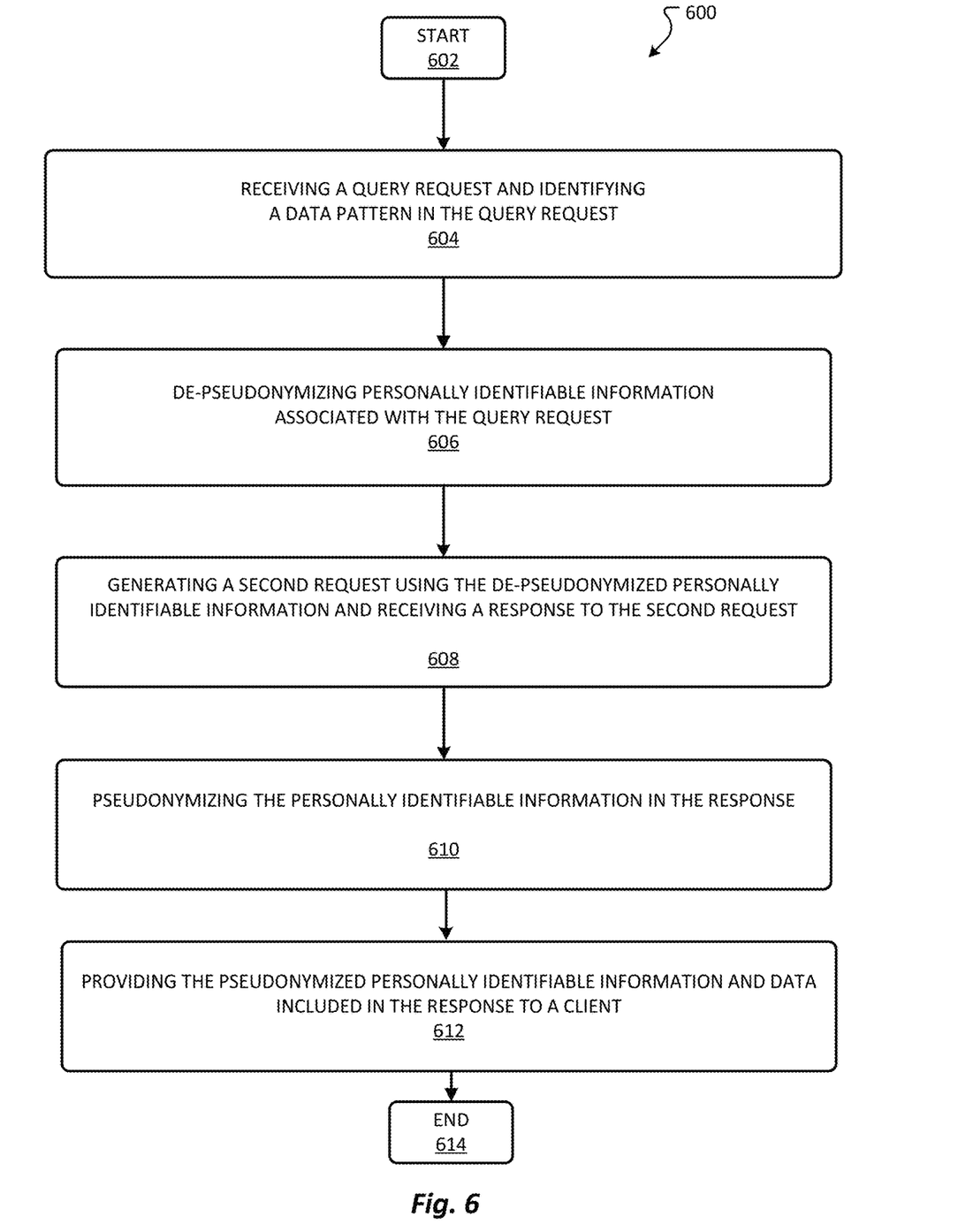
FIG. 6 depicts a simplified method for processing data in accordance with examples of the present disclosure.

Referring now to FIG. 6, a simplified method for processing data is depicted in accordance with examples of the present disclosure. A general order for the steps of a method 600 is shown in FIG. 6. Generally, the method 600 starts at 602 and ends at 614. The method 600 may include more or fewer steps or may arrange the order of the steps differently than those shown in FIG. 6. The method 600 can be executed as a set of computer-executable instructions executed by a computer system and encoded or stored on a computer readable medium. In an illustrative aspect, the method 600 is executed by a computing device, such as a data access gateway for security privacy 108, a gateway for corporate network user 128, and/or a gateway for a second jurisdiction corporate network user 144. However, it should be appreciated that aspects of the method 600 may be performed by one or more processing devices, such as a computer, server, or other hardware element. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, etc. described in conjunction with FIGS. 1-5.

The method 600 starts at 602, where flow may proceed to 604. At 604, a data request may be received from an originating device associated with a user. For example, a request for information may be received from a user device. In accordance with examples of the present disclosure, a policy associated with the originating device and/or a user associated with the originating device may be determined and personally identifiable information may be de-pseudonymized 606. Using the de-pseudonymized information, a second request may be generated at 608, where the second request is based on or otherwise uses the de-pseudonymized information. As an example, a response including information responsive to the originating request may be requested in the second request. The method then moves to 610, where the response may be pseudonymized based on personally identifiable information that is returned. At 612, the pseudonymized personally identifiable information responsive to the original request may then be provided to the requesting user or otherwise device associated with the requesting user. At 614, the method 600 may end.

Figure 7:
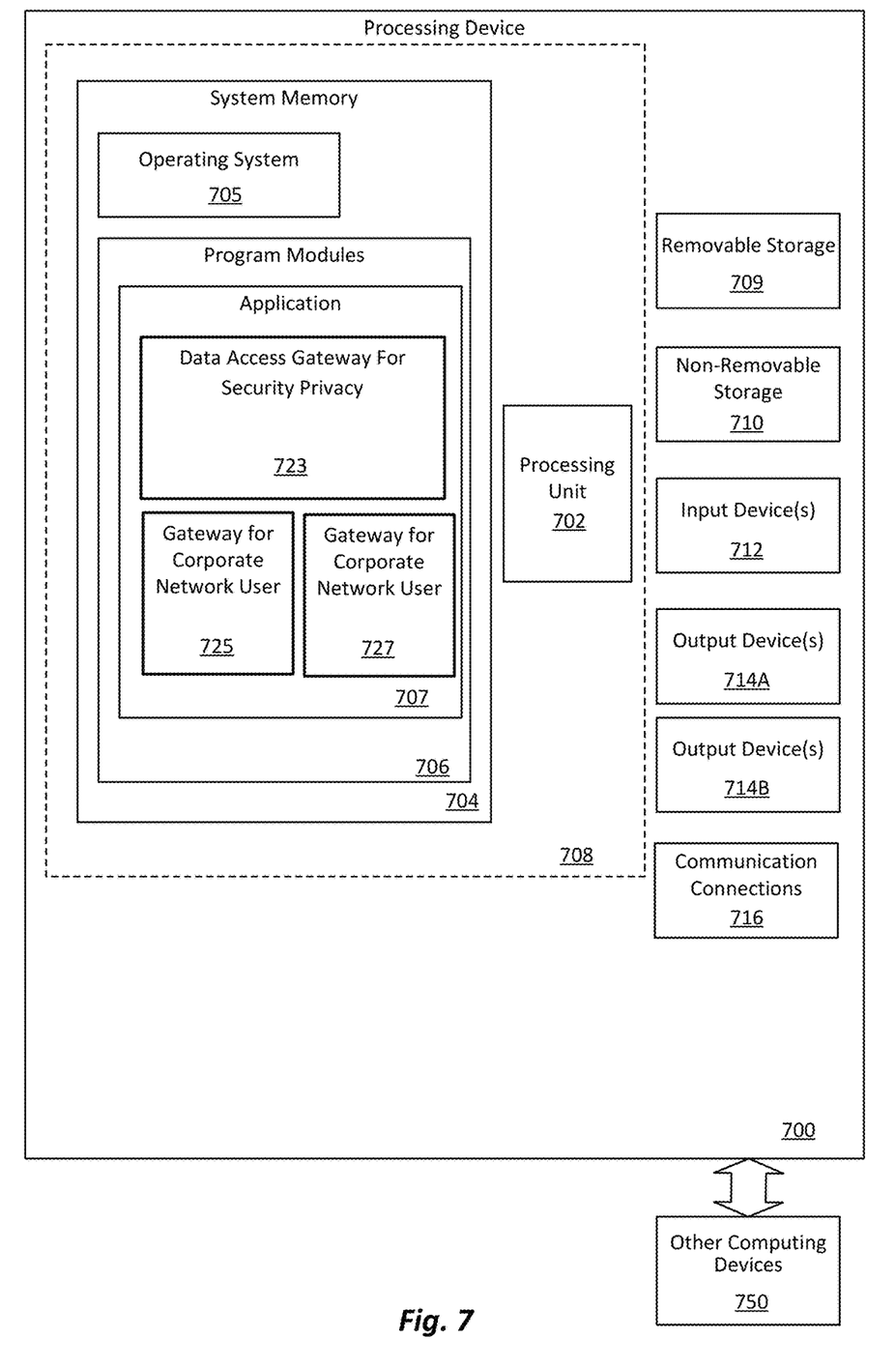
FIG. 7 depicts a block diagram illustrating physical components (e.g., hardware) of a computing device with which aspects of the disclosure may be practiced.

FIG. 7 is a block diagram illustrating physical components (e.g., hardware) of a processing device 700 with which aspects of the disclosure may be practiced. For example, the processing device 700 may represent one or more components as depicted in FIGS. 1-6. In a basic configuration, the processing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for performing the various aspects disclosed herein such. The operating system 705, for example, may be suitable for controlling the operation of the processing device 700. Furthermore, aspects of the disclosure may be practiced in conjunction with other operating systems, or any other application program and is not limited to any particular application or system. This basic configuration is illustrated in FIG. 7 by those components within a dashed line 708. The processing device 700 may have additional features or functionality. For example, the processing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, several program modules and data files may be stored in the system memory 704. While executing on the at least one processing unit 702, an application 720 or program modules 706 may perform processes including, but not limited to, one or more aspects, as described herein. The application 720 may include an application interface 721 which may be the same as or similar to the application interface 721 as previously described in more detail with regard to FIGS. 1-6. The application 720 may include a data access gateway for security privacy 723, which may be the same as or similar to the data access gateway for security privacy previously described. The application 720 may include a gateway for second jurisdiction corporate network users 727 and gateway for corporate network users 725 as previously described in more detail with regard to FIGS. 1-6. In addition, the application 720 may include a policy 729. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the processing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The processing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The processing device 700 may include one or more communication connections 716 allowing communications with other computing or processing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the processing device 700. Any such computer storage media may be part of the processing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for processing data according to at least the examples provided in the sections below:

(A1) In one aspect, some examples include a method for processing data. The method may include: receiving a query request and identifying a data pattern in the query request, de-pseudonymizing personally identifiable information associated with the query request, generating a second request using the de-pseudonymized personally identifiable information and receiving a response to the second request, pseudonymizing the personally identifiable information in the response and providing the pseudonymized personally identifiable information and data included in the response to a client.

(A2) In some examples of A1 above, the method further includes receiving the query request from a computing device associated with a first user; based on information associated with at least one of the computing device or first user, determining a policy to be applied to data in the query request; and applying the policy to the data in the query request.

(A3) In some examples of A1-A2 above, the policy is configured to apply data labels to the data in the query request, the data labels being dependent upon the determined policy.

(A4) In some examples of A1-A3 above, the method further includes routing the query request to specific gateway based on the information associated with at least one of the query request or first user; and routing the request from the specific gateway to an internal data center platform.

(A5) In some examples of A1-A4 above, the method further includes receiving a second query request from a second computing device associated with a second user; based on information associated with at least one of the second user or the second computing device, determining a second policy to be applied to data in the second query request; and routing the second query request to a second specific gateway.

(A6) In some examples of A1-A5 above, the query request is associated with a first jurisdictional entity and the second query request is associated with a second jurisdictional entity that is different from the first jurisdictional entity.

(A7) In some examples of A1-A6 above, the specific gateway is associated with the jurisdictional entity and the second specific gateway is associated with the second jurisdictional entity.

In yet another aspect, some examples include a computing system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart or process. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for processing data, the method comprising:
receiving a query request, the query request including a pseudonymized user identifier;
querying one or more query engines that query a data pattern library and a desensitization strategy based on the received pseudonymized user identifier and identifying a data pattern in the data pattern library based on the pseudonymized user identifier of the query request;
de-pseudonymizing the pseudonymized user identifier of the query request based on the desensitization strategy and the identified data pattern in the data pattern library, wherein the pseudonymized user identifier is used to request a real user identifier based on the pseudonymized user identifier, the desensitization strategy, and the identified data pattern in the data pattern library;
generating a second request using the de-pseudonymized pseudonymized user identifier and receiving a response to the second request;
pseudonymizing the real user identifier in the response; and
providing the pseudonymized user identifier and data included in the response to a client.

2. The method of claim 1, further comprising:
receiving the query request from a computing device associated with a first user;
based on information associated with at least one of the computing device or first user, determining a policy to be applied to data in the query request; and
applying the policy to the data in the query request.

3. The method of claim 2, wherein the policy is configured to apply data labels to the data in the query request, the data labels being dependent upon the determined policy.

4. The method of claim 2, further comprising:
based on the information associated with at least one of the query request or first user, routing the query request to specific gateway; and
routing the request from the specific gateway to an internal data center platform.

5. The method of claim 2, further comprising:
receiving a second query request from a second computing device associated with a second user;
based on information associated with at least one of the second user or the second computing device, determining a second policy to be applied to data in the second query request; and
routing the second query request to a second specific gateway.

6. The method of claim 5, wherein the query request is associated with a first jurisdictional entity and the second query request is associated with a second jurisdictional entity that is different from the first jurisdictional entity.

7. The method of claim 6, wherein the specific gateway is associated with the jurisdictional entity and the second specific gateway is associated with the second jurisdictional entity.

8. A system for processing data, the system comprising:
a storage area; and
a data access gateway for security privacy configured to:
receive a query request, the query request including a pseudonymized user identifier;
query one or more query engines that query a data pattern library and a desensitization strategy based on the received pseudonymized user identifier and identify a data pattern in the data pattern library based on the pseudonymized user identifier of the query request;
de-pseudonymize the pseudonymized user identifier of the query request based on the desensitization strategy and the identified data pattern in the data pattern library, wherein the pseudonymized user identifier is used to request a real user identifier based on the pseudonymized user identifier, the desensitization strategy, and the identified data pattern in the data pattern library;
generate a second request using the de-pseudonymized pseudonymized user identifier and receiving a response to the second request;
pseudonymize the real user identifier in the response; and
provide the pseudonymized user identifier and data included in the response to a client.

9. The system of claim 8, wherein data access gateway for security privacy is configured to:
receive the query request from a computing device associated with a first user;
based on information associated with at least one of the computing device or first user, determine a policy to be applied to data in the query request; and
apply the policy to the data in the query request.

10. The system of claim 9, wherein the policy is configured to apply data labels to the data in the query request, the data labels being dependent upon the determined policy.

11. The system of claim 9, wherein data access gateway for security privacy is configured to:
route the query request to specific gateway based on the information associated with at least one of the query request or first user; and
route the request from the specific gateway to an internal data center platform.

12. The system of claim 9, wherein data access gateway for security privacy is configured to:
receive a second query request from a second computing device associated with a second user;

based on information associated with at least one of the second user or the second computing device, determine a second policy to be applied to data in the second query request; and route the second query request to a second specific gateway.

13. The system of claim 12, wherein the query request is associated with a first jurisdictional entity and the second query request is associated with a second jurisdictional entity that is different from the first jurisdictional entity.

14. The system of claim 13, wherein the specific gateway is associated with the jurisdictional entity and the second specific gateway is associated with the second jurisdictional entity.

15. An electronic device, comprising:
a memory and a processor;
wherein the memory is used to store one or more computer instructions which, when executed by the processor, cause the processor to:
 receive a query request, the query request including a pseudonymized user identifier;
 query one or more query engines that query a data pattern library and a desensitization strategy based on the received pseudonymized user identifier and identify a data pattern in the data pattern library based on the pseudonymized user identifier of the query request;
 de-pseudonymize the pseudonymized user identifier of the query request based on the desensitization strategy and the identified data pattern in the data pattern library, wherein the pseudonymized user identifier is used to request a real user identifier based on the pseudonymized user identifier, the desensitization strategy, and the identified data pattern in the data pattern library;
 generate a second request using the de-pseudonymized pseudonymized user identifier and receiving a response to the second request;
 pseudonymize the real user identifier in the response; and
 provide the pseudonymized user identifier and data included in the response to a client.

16. The electronic device of claim 15, wherein the processor is configured to:
 receive the query request from a computing device associated with a first user;
 based on information associated with at least one of the computing device or first user, determine a policy to be applied to data in the query request; and
 apply the policy to the data in the query request.

17. The electronic device of claim 16, wherein the policy is configured to apply data labels to the data in the query request, the data labels being dependent upon the determined policy.

18. The electronic device of claim 16, wherein the processor is configured to:
 route the query request to specific gateway based on the information associated with at least one of the query request or first user; and
 route the request from the specific gateway to an internal data center platform.

19. The electronic device of claim 16, wherein the processor is configured to:
 receive a second query request from a second computing device associated with a second user;
 based on information associated with at least one of the second user or the second computing device, determine a second policy to be applied to data in the second query request; and
 route the second query request to a second specific gateway.

20. The electronic device of claim 19, wherein the query request is associated with a first jurisdictional entity and the second query request is associated with a second jurisdictional entity that is different from the first jurisdictional entity.

* * * * *